United States Patent
Byrne et al.

(10) Patent No.: US 11,165,624 B2
(45) Date of Patent: Nov. 2, 2021

(54) SENTRY FOR INFORMATION TECHNOLOGY SYSTEM BLUEPRINTS

(71) Applicant: International Business Machines Corporation, Armonk, NY (US)

(72) Inventors: Brian P. Byrne, Austin, TX (US); Ivan M. Milman, Austin, TX (US); Martin A. Oberhofer, Bondorf (DE); Sushain Pandit, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1568 days.

(21) Appl. No.: 13/759,117

(22) Filed: Feb. 5, 2013

(65) Prior Publication Data

US 2014/0222991 A1 Aug. 7, 2014

(51) Int. Cl.
- *G06Q 10/06* (2012.01)
- *H04L 12/24* (2006.01)
- *G06F 15/173* (2006.01)

(52) U.S. Cl.
CPC ............. *H04L 41/00* (2013.01); *G06Q 10/06* (2013.01); *H04L 41/14* (2013.01); *G06F 15/173* (2013.01)

(58) Field of Classification Search
CPC ... H04L 29/08072; H04L 29/06; H04L 43/00; H04L 12/2602; H04L 41/22; H04L 63/08; H04L 41/12; H04L 67/1095; H04L 45/42; H04L 43/04; H04L 41/00; H04L 41/14; H04L 9/3213; H04L 63/0807; H04L 63/0815; H04L 63/14; G06F 21/31; G06F 9/455; G06F 8/10; G06Q 10/10; G06Q 10/06; G06Q 10/00; G06Q 10/067

USPC ......................................................... 709/224
See application file for complete search history.

(56) References Cited

U.S. PATENT DOCUMENTS

| | | | | |
|---|---|---|---|---|
| 6,118,936 A | * | 9/2000 | Lauer | H04L 41/0631 370/244 |
| 6,456,306 B1 | * | 9/2002 | Chin | H04L 41/0213 709/224 |
| 8,176,465 B2 | | 5/2012 | Dutta et al. | |
| 8,443,438 B1 | * | 5/2013 | Sharir | H04L 67/02 726/22 |
| 2004/0061701 A1 | * | 4/2004 | Arquie | H04L 41/12 345/440 |
| 2005/0201299 A1 | * | 9/2005 | Radi | H04L 67/1095 370/254 |

(Continued)

OTHER PUBLICATIONS

Wikipedia Article: Sensor: https://en.wikipedia.org/wiki/Sensor (Year: 2012).*

(Continued)

*Primary Examiner* — Hitesh Patel
*Assistant Examiner* — Clifton Houston
(74) *Attorney, Agent, or Firm* — Cuenot, Forsythe & Kim, LLC

(57) ABSTRACT

Lifecycle management for blueprints of information technology systems includes determining, using a processor, a component referenced by a blueprint defining an information technology system and determining a component tool used to manage the component. The component is registered with a sensor within the component tool. Responsive to detecting a change in status of the component within the component tool, the sensor sends a notification.

20 Claims, 5 Drawing Sheets

(56) References Cited

U.S. PATENT DOCUMENTS

| | | | | |
|---|---|---|---|---|
| 2006/0168208 | A1* | 7/2006 | Nagami | H04L 41/0893 709/224 |
| 2007/0153708 | A1* | 7/2007 | Dominick | H04L 41/22 370/254 |
| 2007/0283002 | A1* | 12/2007 | Bornhoevd | G06F 8/60 709/224 |
| 2008/0162673 | A1* | 7/2008 | Basheer Ahamed | H04W 84/14 709/220 |
| 2010/0257010 | A1* | 10/2010 | Allam | G06Q 10/063 705/7.11 |
| 2011/0072486 | A1* | 3/2011 | Hadar | G06F 9/45558 726/1 |
| 2011/0072487 | A1* | 3/2011 | Hadar | G06F 9/5072 726/1 |
| 2011/0126207 | A1* | 5/2011 | Wipfel | H04L 63/0815 718/104 |
| 2012/0060141 | A1* | 3/2012 | Demant | G06F 8/10 717/101 |
| 2012/0136993 | A1* | 5/2012 | Gao | H04L 43/0876 709/224 |
| 2012/0150548 | A1 | 6/2012 | Rajagopalan et al. | |
| 2012/0151056 | A1* | 6/2012 | Sporel | H04L 41/0896 709/225 |
| 2013/0174261 | A1* | 7/2013 | Wilkerson | H04L 41/5064 726/25 |
| 2013/0232498 | A1* | 9/2013 | Mangtani | G06F 9/5038 718/104 |
| 2013/0262500 | A1* | 10/2013 | Bratspiess | H04L 43/103 707/769 |

OTHER PUBLICATIONS

WhatIs.com Article: Sensor: https://whatis.techtarget.com/definition/sensor (Year: 2012).*

Wikipedia Article: Installation of Computer Programs: https://en.wikipedia.org/wiki/lnstallation_(computer_programs) (Year: 2012).*

* cited by examiner

SENTRY FOR INFORMATION TECHNOLOGY SYSTEM BLUEPRINTS

BACKGROUND

When building an information technology (IT) system, e.g., a computing system that includes one or more networked or inter-connected computing systems, a computer aided design (CAD) tool is often used to develop a blueprint. The blueprint specifies the architecture of the IT system and the various physical assets that are to be used in implementing the IT system. For a variety of reasons, there are often differences between the blueprint of the IT system and the physical assets that are ultimately used to implement the IT system. In some cases, for example, the personnel responsible for implementing a particular physical asset may choose a different implementation than is specified in the blueprint. In other cases, the blueprint changes, but the changes are not provided to the personnel implementing the underlying physical assets affected by the change. In still other cases, the personnel implementing the IT system enhance and/or modify the IT system during its lifecycle without updating the blueprint. In each of the aforementioned scenarios, the blueprint becomes inaccurate and largely obsolete. The value and usefulness of the blueprint is significantly diminished.

BRIEF SUMMARY

A method includes determining, using a processor, a component referenced by a blueprint defining an information technology (IT) system, determining a component tool used to manage the component, and registering the component with a sensor within the component tool. Responsive to the sensor detecting a change in status of the component within the component tool, a notification is sent.

A method includes receiving a user input requesting verification of a blueprint defining an IT system. The method also includes, responsive to the user input, determining, using a processor, a component referenced by the blueprint and sending an inquiry for the component to a component tool used to manage the component. The method further includes receiving status information for the component from the component tool and displaying an indication of the status information for the component.

A system includes a processor programmed to initiate executable operations. The executable operations include determining a component referenced by a blueprint defining an IT system, determining a component tool used to manage the component, and registering the component with a sensor within the component tool. Responsive to the sensor detecting a change in status of the component within the component tool, a notification is sent.

A computer program product includes a computer readable storage medium having program code stored thereon. The program code is executable by a processor to perform a method. The method includes determining, using the processor, a component referenced by a blueprint defining an IT system, determining, using the processor, a component tool used to manage the component, and registering, using the processor, the component with a sensor within the component tool. Responsive to the sensor detecting a change in status of the component within the component tool, a notification is sent.

DETAILED DESCRIPTION

Figure 1:
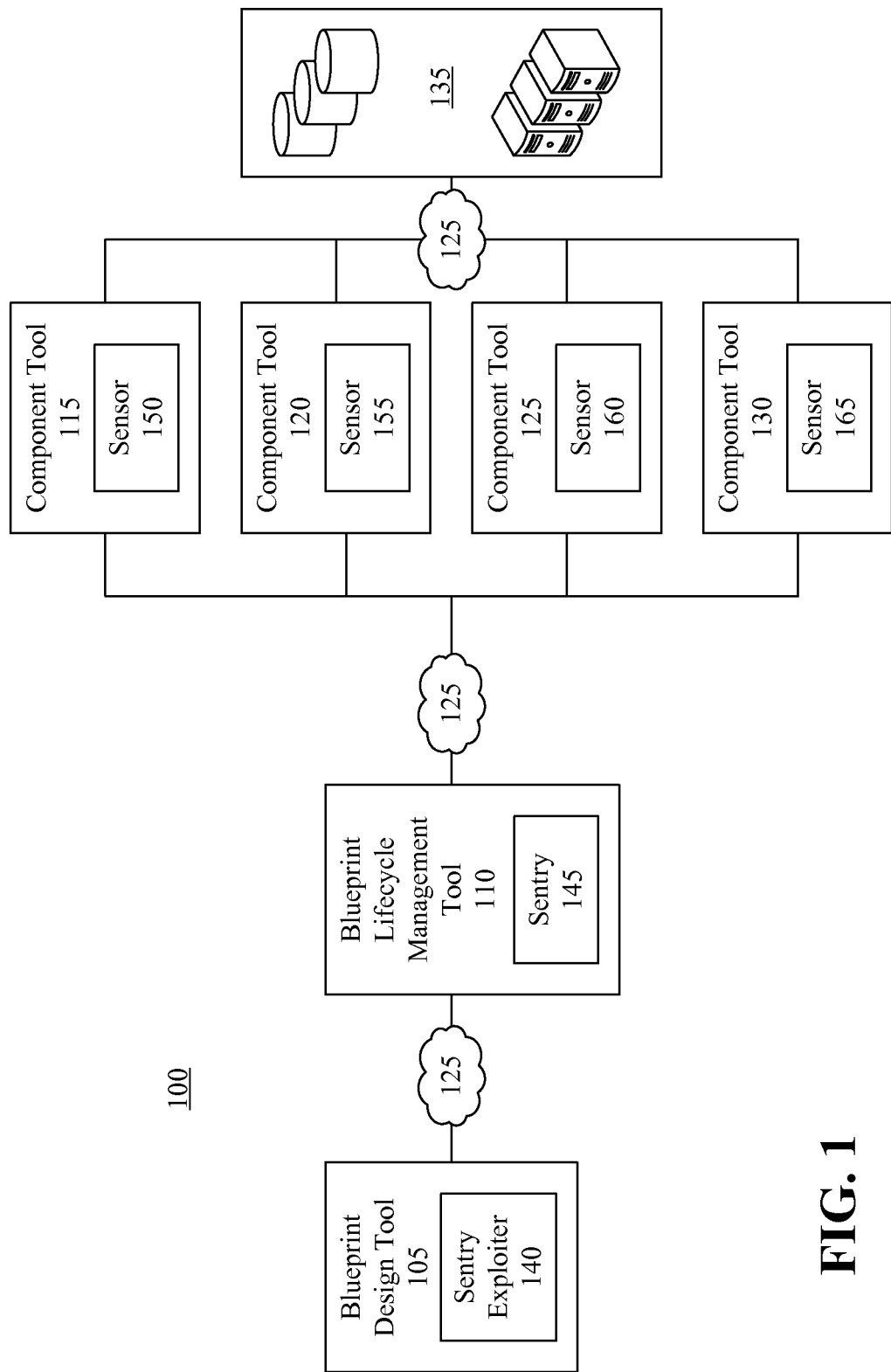
FIG. 1 is a block diagram illustrating an example of a blueprint management system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

One or more embodiments relate to managing a blueprint for an information technology (IT) system. In accordance with the inventive arrangements disclosed within this specification, a blueprint for an IT system is maintained to accurately reflect the actual implementation of the IT system and changes over time. The blueprint is maintained by utilizing a blueprint lifecycle management tool in combination with one or more sensors. The sensors are deployed to various other tools used to maintain individual components of the IT system. Sensors also can be deployed to a node of an IT system. As changes occur to the components of the IT system as maintained within the tools or as executed and/or utilized within an operational node of the IT system, the sensors report the changes to the blueprint lifecycle management tool. Accordingly, a user is informed of changes to components of the IT system when using the blueprint lifecycle management tool or another tool in communication with the blueprint lifecycle management tool. Further aspects are described below with reference to the figures.

FIG. 1 is a block diagram illustrating an example of a blueprint management system 100. Blueprint management system 100 includes a blueprint design tool 105, a blueprint lifecycle management tool 110, one or more component tools 115-130, and an IT system 135. The various elements illustrated, e.g., blueprint design tool 105, blueprint lifecycle management tool 110, component tools 115-130, and IT system 135 operate and communicate using a network 125. Network 125 can be implemented as, or include, any of a variety of different networks such as a WAN, a LAN, a wireless network, a mobile network, a Virtual Private Network (VPN), the Internet, or the like.

Blueprint design tool 105 is implemented as a data processing system executing suitable operational software. Under user control, blueprint design tool 105 is used to create blueprints for an IT system. Blueprint design tool 105 includes, i.e., executes, a sentry exploiter 140. Sentry exploiter 140 is configured to interact with blueprint lifecycle management tool 110 and, more particularly, with sentry 145 executing therein.

A "blueprint" for an IT system is a diagram that represents and defines an IT system such as IT system 135. The blueprint defines the architecture of the IT system. The blueprint specifies the particular components that, taken collectively, form the IT system. Examples of components include the physical assets of the IT system, e.g., servers, networking equipment, storage devices, etc. The blueprint further can specify configuration details, e.g., through annotation of the diagram, relating to the components such as operating system type, version, application software executing therein, as well as interconnectivity with other components of the blueprint for the IT system. An "IT system" means a group of interconnected or networked computing nodes. A "node" is a physical computing system, data processing system, or other machine that is a part of the IT system. The IT system can include one or more different and interconnected tiers such as an application tier, a database tier, etc., where each tier include one or more nodes.

In one aspect, a component referenced in a blueprint can include a link or address for the component. The link can be executed or followed to determine whether the link, and as such, the component associated with the link, in the blueprint is still valid and accurate. An invalid link for a component of the blueprint indicates that the component is no longer used in the IT system and the blueprint is out of date.

Blueprint lifecycle management tool 110 is implemented as a data processing system executing suitable operational software. Blueprint lifecycle management tool 110 is configured to provide functions for managing blueprints for IT systems. Using blueprint lifecycle management tool 110, users can check blueprints in for lifecycle management, check blueprints out for editing, version blueprints, create development tasks for blueprints, indicate progress on development tasks for blueprints, etc. Sentry 145, as noted, communicates with sentry exploiter 140 and one or more of sensors 150-165.

Sensors 150-165 execute within component tools 115-130, respectively. Each of component tools 115-130 is implemented as a data processing system executing suitable operational software for managing components of a particular type used to implement IT systems. In one aspect, each of component tools 115-130 belongs to one of two different classes or categories. The first class of component tool includes operational tools. The second class of component tool includes implementation runtimes and/or metadata repositories. As such, component tools 115-130 are implemented as either a tool of the first class or a tool of the second class as described in further detail below.

Referring to the first class of component tool, an operational tool performs functions such as maintaining information relating to hardware assets including, but not limited to, network devices, storage devices, servers, and the like. Exemplary information stored by an operational tool includes, but is not limited to, the number of central processing units (CPUs) for a particular device (physical asset or component), memory size for a particular device, or the like. An operational tool further can store data relating to installed software on a component such as an operating system, J2EE applications, services, and the like along with corresponding versions, patch levels, maintenance windows, backup windows, etc. Examples of operational tools include, but are not limited to, a network tool configured to manage networking device infrastructure of an IT system, a system tool configured to manage the lifecycle of an IT system, and/or a services tool configured to store information about deployed services within an IT system. In some cases, a service tool is referred to as a "service registry."

Exemplary tools belonging to the second class of component tool include, but are not limited to, Extract, Transform, and Load (ETL) tools, data design tools, and/or reporting tools. An ETL tool refers to the runtime environment for one or more ETL jobs. A data design tool refers to a tool that creates and maintains data models, whether logical or physical. In one embodiment, one or more data models can be checked into and/or out of blueprint lifecycle management tool 110. Furthermore, data models are deployed into various other operational systems (e.g., component tools) such as Master Data Management (MDM) systems, Data warehouse (DW) systems, and/or ETL tools. A reporting tool refers to a tool configured to design and provide runtime functions for business intelligence reports.

Sensors 150-165 are configured to respond to requests for information from sentry 145 and/or sentry exploiter 140. For example, sensors 150-165 respond to inquiries from sentry exploiter 140 and/or sentry 145 as part of an active validation process for a blueprint. Sensors 150-165 also are configured to report information such as changes in any of the configuration details of a particular component, whether a device or software, that is used within, or referenced by, a blueprint for an IT system as described within this specification. More particularly, each of sensors 150-165 is configured to report status changes for items managed by the particular component tool in which the sensor is operating to either sentry 145 and/or sentry exploiter 140. Reporting changes in status for the particular tool in which a sensor executes is part of a passive validation process for a blueprint.

In another example, a sensor can be implemented as a standalone application within a node of the IT system while in operation as part of the IT system, as opposed to being implemented within a component tool used to manage one or more components of the IT system. The sensor can function substantially the same as described. The installation mechanism of a sensor implemented as a standalone application, however, would differ from that of a sensor implemented within, or as part of, a component tool. As such, one or more sensors can be implemented as a standalone application within a node. It should be appreciated, however, that sensors can be implemented entirely as standalone applications within nodes of the IT system, entirely within component tools, or as a combination of the two varieties of sensors.

For purposes of illustration, reference to blueprint design tool 105 also refers to operation of sentry exploiter 140 executing therein and vice versa. Similarly, reference to blueprint lifecycle management tool 110 also refers to operation of sentry 145 and vice versa. Finally, reference to one of component tools 115-130 also refers to operation of the particular sensor executing therein and vice versa.

In operation, a user creates a blueprint for an IT system using blueprint design tool 105. The blueprint, for example, can define IT system 135. IT system 135 can include one or more components as managed by component tools 115-130 in any of a variety of combinations. As such, the blueprint for IT system 135 includes a reference, or link, to each of the components maintained by one or more or all of tools 115-130 that collectively form IT system 135.

The blueprint can be checked into blueprint lifecycle management tool 110. In one aspect, sentry exploiter 140 is operable to flag the blueprint within blueprint lifecycle management tool 110 as complete for a project phase. Marking the blueprint complete indicates that IT system 135 can be deployed and that the components of IT system 135 are to be monitored by sentry 145. The process of flagging a blueprint to indicate that the blueprint is complete and ready for monitoring is also referred to herein as flagging or otherwise indicating that a blueprint is ready for lifecycle management. In one aspect, sentry 145 deploys at least one sensor to each one of component tools 115-130 that maintains a component referenced by the blueprint. For example, each component tool that maintains an ETL job, a data model, etc., will include a sensor.

Each of sensors 150-165, depending upon the particular type of tool in which the sensor is deployed, is configured to detect a change to a component referenced by the blueprint. Responsive to detecting a status change for a component referenced by the blueprint, the sensor that detected the status change sends a notification to sentry 145.

Within blueprint design tool 105, sentry exploiter 140 is notified of any changes to referenced, or linked, assets for the blueprint. Sentry exploiter 140 can be notified using any of a variety of different techniques. In one example, each time a connection is established between blueprint design tool 105 and blueprint lifecycle management tool 110, sentry 145 pushes any, or all, notifications applicable to blueprint design tool 105 to sentry exploiter 140.

In another example, each time a particular component referenced by the blueprint and managed by one of component tools 115-130 is powered on or activated, the component tool, e.g., the sensor executing therein, sends a notification indicating that the component is powered on or activated to blueprint lifecycle management tool 110. Blueprint lifecycle management tool 110 then pushes a notification back to blueprint design tool 105.

In one aspect, the status of one or more components referenced by the blueprint can be indicated with an icon or other visual identifier. For example, an icon can be located in a system tray or a menu bar of a user's computing system as generated by an agent or other monitoring program. The appearance of the icon can be changed to indicate whether a notification is available for the blueprint. Responsive to the user selecting the icon, blueprint design tool 105 is started and any relevant notifications from blueprint lifecycle management tool 110 are displayed.

In still another example, a control can be provided within blueprint design tool 105. In one aspect, responsive to a user selection of the control, sentry exploiter 140 retrieves or requests any relevant notifications from sentry 145 for the blueprint. In another aspect, sentry exploiter 140 sends a request for verification for the blueprint to sentry 145. Sentry 145, responsive to the request for verification, sends an inquiry to the particular component tools that manage components of the IT system defined by the blueprint as described in further detail within this specification. The control allows a user to effectively execute a verification process upon the blueprint to initiate interrogation of various ones of sensors 150-165 that are relevant to the blueprint to determine whether the component referenced by the blueprint is still the correct component.

Within blueprint lifecycle management tool 110, sentry 145 performs one or more operations that support and/or enhance those of sentry exploiter 140. For example, sentry 145 performs functions such as sensor creation, sensor deletion, receiving notifications from sensors once created and/or deployed, performing verification as requested by sentry exploiter 140, blueprint analysis, and comparison of different versions of a blueprint.

Responsive to a blueprint being marked as complete for a project phase, sentry 145 parses the blueprint and creates a list of all linked, or referenced, components, and the particular component tool used to manage each component. Based upon the component tool list, sentry 145 deploys sensors 150-165 to component tools 115-130. This example presumes that the blueprint for IT system 135 includes at least one component that is managed by each of component tools 115-130. If a component tool already has an active sensor deployed therein, or once a sensor has been deployed to the component tool, sentry 145 instructs the sensor to register the component referenced by the blueprint that requires monitoring within the component tool.

Sensor deletion refers to an operation in which a sensor is rendered inactive. A sensor is deleted from a selected component tool under control of sentry 145 responsive to a determination that no blueprint in blueprint lifecycle management tool 110 that is marked complete, and thus ready for monitoring, references a component managed by the selected component tool. For example, when no blueprint marked complete within blueprint lifecycle management tool 110 references a component within component tool 115, sensor 150 is deleted. Within this specification, sensor deletion can refer to actual deletion of a sensor, uninstalling a sensor, or otherwise rendering the sensor inactive. Within this specification, sensor deletion also is referred to as "un-deploying" a sensor.

Receiving notifications refers to sentry 145 receiving notifications from one or more of sensors 150-165 indicating a change in status for a component monitored by the sensor. The notification can specify the nature or form of the change that occurred. In one aspect, responsive to a notification of a change, blueprint lifecycle management tool 110 allows a user to create tasks that can be assigned to one or more users to be performed. The tasks can be assigned to the particular user that is responsible for the changed component. Progress on the tasks can be logged over time. Tasks further can be marked completed.

Verification refers to a process in which sentry 145 receives a verification request for a blueprint. Responsive to the verification request, which, for example, may be sent by blueprint design tool 105, sentry 145 sends an inquiry to sensors 150-165. Sentry 145 receives status information from each of sensors 150-165 responsive to the inquiry, aggregates the status information, and reports the status information back to blueprint design tool 105 and, more particularly, sentry exploiter 140.

Version comparison refers to a process in which sentry 145 detects a new version of a blueprint that is marked complete indicating that the blueprint is ready for monitoring. Sentry 145 compares the prior version with the current version. For any component no longer linked or referenced by a current version of a blueprint, sentry 145 sends a de-register message to the appropriate sensor. The de-register message instructs the sensor to de-register the component no longer referenced by the current version of the blueprint, and as such, no longer monitor the component. Sensor deletion also can be performed when all components monitored by a sensor have been de-registered. For any new asset referenced by the current version of the blueprint, sentry 145 sends a registration message to the appropriate sensor. Appreciably, if the component tool that manages the new component does not have a sensor, a sensor is deployed.

Within one or more or each of tools 115-130, an interface supporting sensor configuration is provided. The interface can be provided as part of the sensor deployed in each respective one of tools 115-130. Through the interface, operational parameters for the sensor can be set. Examples of operational parameters for sensors include, but are not limited to, frequency of checking on status change of components being monitored by the sensor, and whether to send individual notifications where status change is indicated with one notification (message) per component or batched notifications in which status change information for two or more components is provided in a single notification.

Each sensor further includes the following functions that can be invoked by sentry 145: un-deploy, register component(s), de-register component(s), and inquiry. Un-deploy deletes a sensor as previously described. Register component(s) allows sentry 145 to indicate which additional component(s) maintained within the component tool in which the sensor resides are to be monitored for status changes. De-register component(s) allows sentry 145 to instruct a sensor which component(s) currently being monitored are no longer to be monitored. Inquiry allows sentry 145 to request verification, e.g., status information, for the assets monitored by the sensor.

Figure 2:
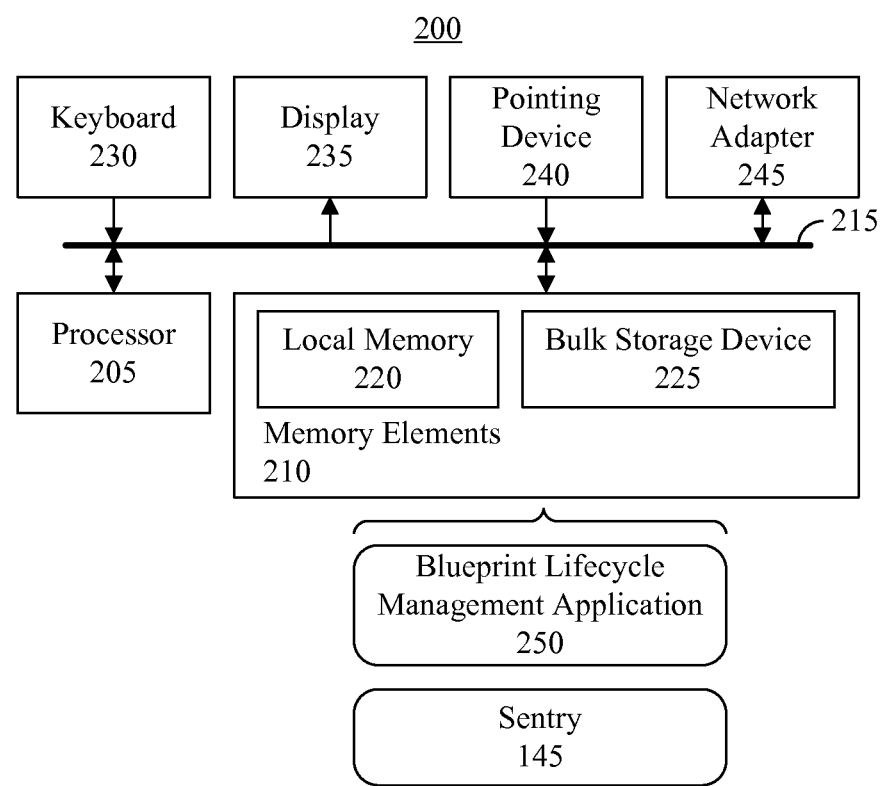
FIG. 2 is a block diagram illustrating an example of a data processing system for blueprint lifecycle management.

FIG. 2 is a block diagram illustrating an exemplary data processing system (system) 200 that can be used to implement the blueprint lifecycle management tool 110 of FIG. 1. System 200 includes at least one processor (e.g., a CPU) 205 coupled to memory elements 210 through a system bus 215 or other suitable circuitry. As such, system 200 can store program code within memory elements 210. Processor 205 executes the program code accessed from memory elements 210 via system bus 215. In one aspect, system 200 is implemented as a computer or other programmable data processing apparatus that is suitable for storing and/or executing program code. It should be appreciated, however, that system 200 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), a solid state drive (SSD), or other persistent data storage device. System 200 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to system 200. The I/O devices can be coupled to system 200 either directly or through intervening I/O controllers. One or more network adapters 245 also can be coupled to system 200 to enable system 200 to become coupled to other systems, computer systems, remote printers, and/or remote storage devices through intervening private or public networks. Modems, cable modems, and Ethernet cards are examples of different types of network adapters 245 that can be used with system 200.

As pictured in FIG. 2, memory elements 210 store blueprint lifecycle management application 250 and sentry 145. Blueprint lifecycle management application 250 and sentry 145, being implemented in the form of executable program code, are executed by system 200 and, as such, are an integrated part of system 200. Blueprint lifecycle management application 250, sentry 145, blueprints, etc. are functional data structures that impart functionality when employed as part of system 200.

It should be appreciated that while FIG. 2 is provided as an example of blueprint lifecycle management tool 110, the architecture described can be used for any of the various data processing systems noted within this specification. For example, the architecture described with reference to FIG. 2 can be used to implement blueprint design tool 105 and/or one or more or all of component tools 115-130. Appreciably, the component tool software executed by system 200 will vary according to the particular data processing system that is implemented, e.g., blueprint design tool 105, blueprint lifecycle management tool 110, and/or component tools 115-130. In each case, however, the executable program code and any data items upon which the executable program code operates are an integrated part of the system and form functional data structures that impart functionality when employed as part of the system. For example, in the case of blueprint design tool 105, a blueprint design application, sentry exploiter 140, and blueprints are functional data structures. In the case of tools 115-130, each of sensors 150-165 and the particular component tool application executing therein, the components, and data relating to the components are functional data structure.

Figure 3:
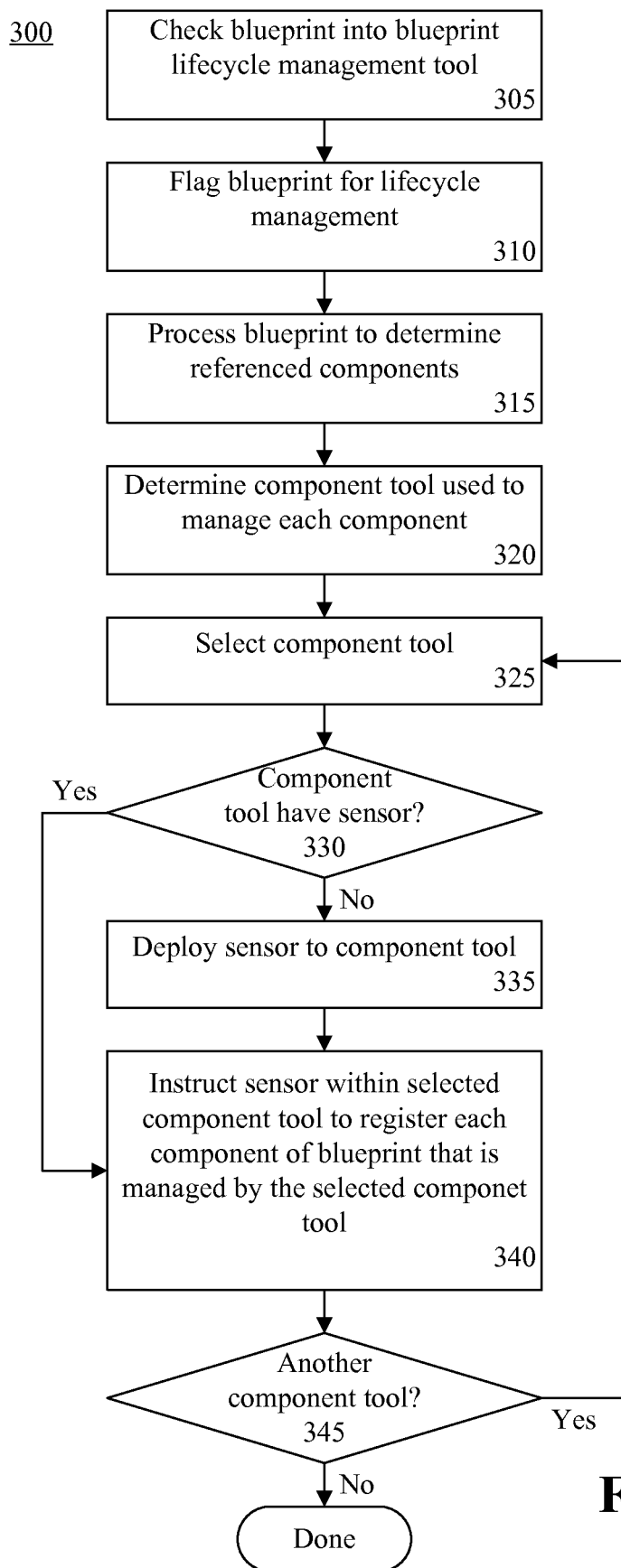
FIG. 3 is a flow chart illustrating an example of a method of maintaining a blueprint for an information technology (IT) system.

FIG. 3 is a flow chart illustrating an example of a method of maintaining a blueprint for an IT system. Method 300 is implemented by the blueprint management system described with reference to FIG. 1. Method 300 presumes that a blueprint for an IT system has been created.

In block 305, the blueprint is checked into the blueprint lifecycle management tool. As noted, in one aspect, the blueprint is checked into the blueprint lifecycle management tool by a user working through the blueprint design tool. In block 310, the blueprint is flagged for lifecycle management.

Responsive to being flagged for lifecycle management, the blueprint lifecycle management tool determines the components that are referenced by the blueprint in block 315. For example, the blueprint lifecycle management tool parses the blueprint to identify each component that is referenced therein or for which the blueprint includes a link. The blueprint lifecycle management tool makes a list of the components referenced by the blueprint.

In block 320, the blueprint lifecycle management tool determines the particular tool that is used to manage each of the components identified in block 315. In block 325, the blueprint lifecycle management tool selects a tool from the list compiled in block 320 as the current tool being processed. In block 330, the blueprint lifecycle management tool determines whether the current tool includes a sensor. The lifecycle management tool, for example, can maintain a list of each component tool that includes a sensor and maintain such list as sensors are deployed and un-deployed. More particularly, the blueprint lifecycle management tool determines whether a sensor was previously deployed to the current tool and not un-deployed.

If the current component tool does have a sensor, method 300 proceeds to block 340. If not, method 300 continues to block 335. In block 335, a sensor is deployed to the current component tool. In one aspect, deploying a sensor means that an inactive sensor already included in the tool is activated by the blueprint lifecycle management tool, e.g., responsive to an instruction or message sent to the component tool. In another aspect, a sensor is installed or created within the component tool.

In block 340, the blueprint lifecycle management tool instructs the sensor within the current component tool to register each component of the blueprint that is managed in the current component tool. For example, the blueprint lifecycle management tool can invoke the register additional component(s) function of the sensor by sending a message specifying the particular component(s) referenced by the blueprint and managed by the component tool to be registered with the sensor for monitoring.

As discussed, a sensor also can be implemented within a node of the IT system as a standalone application. In that case, one or more nodes of the IT system can be evaluated as are the component tools as described with reference to block 330 and FIG. 3. A sensor can be deployed to the node(s) as required to monitor components within or hosted by the node that are part of, or utilized by, the IT system. Once the sensor is installed, any components within the node that are part of the IT system are registered with the sensor.

In block 345, the blueprint lifecycle management tool determines whether another component tool is to be processed on the list of component tools generated in block 320. If one or more component tools remain to be processed, method 300 loops back to block 325. If no further component tools remain for processing, method 300 ends.

Figure 4:
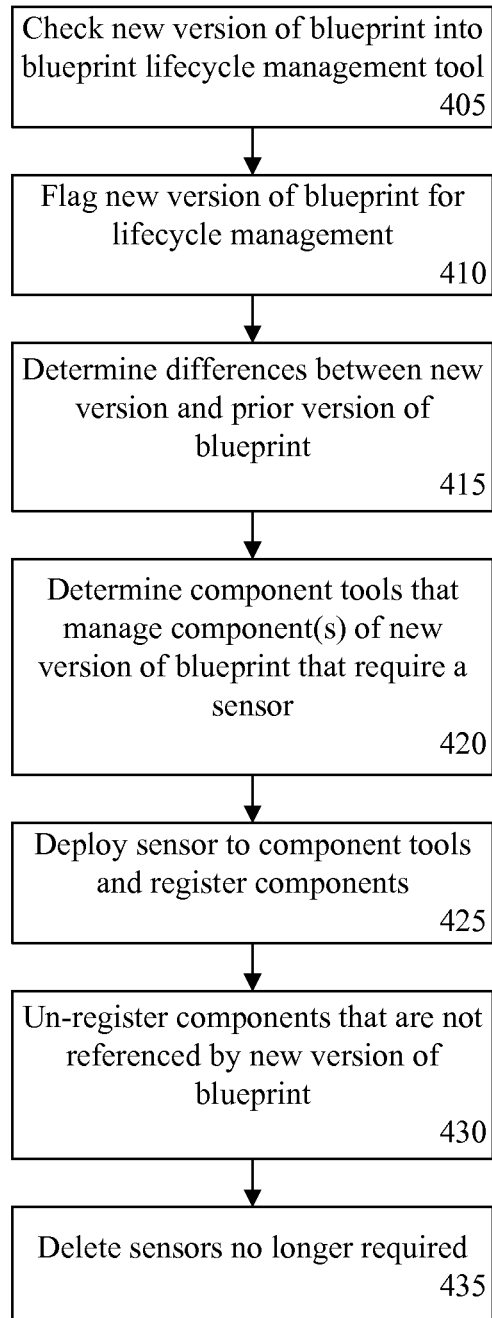
FIG. 4 is a flow chart illustrating another example of a method of maintaining a blueprint for an IT system.

FIG. 4 is a flow chart illustrating another example of a method 400 of maintaining a blueprint for an IT system. More particularly, method 400 illustrates an exemplary technique for versioning blueprints. Method 400 is implemented by a blueprint management system as described with reference to FIG. 1.

In block 405, a new version of a blueprint is checked into the blueprint lifecycle management tool. In block 410, the new version of the blueprint is flagged for lifecycle management. In block 415, the blueprint lifecycle management tool determines differences between the new version and the prior version of the blueprint. In particular, the blueprint lifecycle management tool determines the assets that are referenced by the new version of the blueprint. The blueprint lifecycle management tool further compares the components referenced by the new version of the blueprint with the components that are referenced by the prior version of the blueprint.

In block 420, the blueprint lifecycle management tool determines which, if any tools, manage components of the new version of the blueprint that do not have a sensor and, as such, require a sensor. In block 425, the blueprint lifecycle management tool deploys a sensor to each tool identified in block 420. Further, the blueprint lifecycle management tool sends a register component message to each sensor that is deployed to register the components referenced by the blueprint that are managed by the component tool.

In block 430, the blueprint lifecycle management tool de-registers any components referenced by the prior version of the blueprint that are not referenced by the new version of the blueprint. In block 435, the blueprint lifecycle management tool deletes any sensors from component tools that are no longer required. As noted, in one aspect, a sensor is deleted from a selected component tool when no blueprint within the blueprint lifecycle management tool references a component that is managed by the selected component tool.

Figure 5:
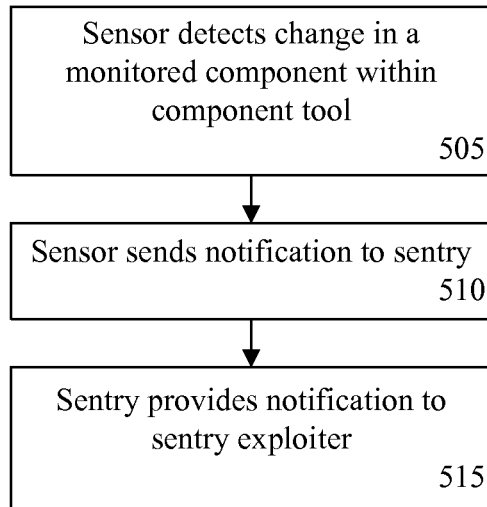
FIG. 5 is a flow chart illustrating another example of a method of maintaining a blueprint for an IT system.

FIG. 5 is a flow chart illustrating another example of a method 500 of maintaining a blueprint for an IT system. More particularly, method 500 illustrates a passive verification process used to maintain a blueprint. Method 500 is implemented by a blueprint management system as described with reference to FIG. 1. Method 500 begins in a state where a blueprint has been flagged for lifecycle management and any required sensors have been deployed to the pertinent component tools.

In block 505, a sensor detects a change in status to a monitored component within the component tool. An example of a change in status includes the creation of a new version of the component, deletion of the component, movement of the component to a different location, e.g., a different network address etc., or the like. In block 510, responsive to detecting the change in status, the sensor sends a notification to the sentry executing within the blueprint lifecycle management tool. In block 515, the sentry sends a notification to the sentry exploiter executing within the blueprint design tool. The notification can be sent to the sentry exploiter using any of the various techniques described within this specification.

Figure 6:
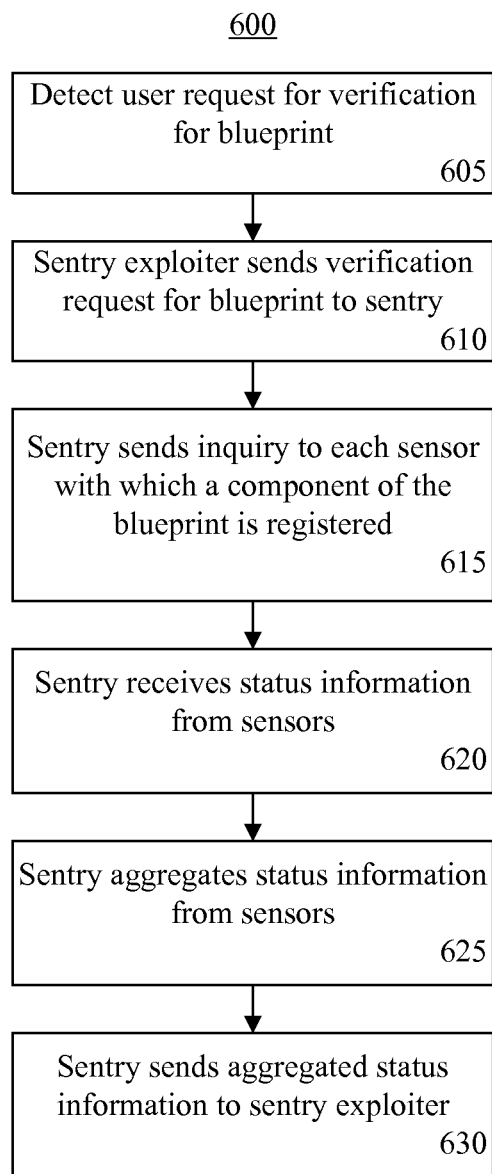
FIG. 6 is a flow chart illustrating another example of a method of maintaining a blueprint for an IT system.

FIG. 6 is a flow chart illustrating another example of a method 600 of maintaining a blueprint for an IT system. More particularly, method 600 illustrates an active verification process used to maintain a blueprint. Method 600 is implemented by a blueprint management system as described with reference to FIG. 1. Method 600 begins in a state where a blueprint has been flagged for lifecycle management and any required sensors have been deployed to the pertinent component tools.

In block 605, the blueprint design tool detects a user input requesting verification for the blueprint flagged for lifecycle management within the blueprint lifecycle management tool. For example, the user can select or activate a control using an interface provided by the blueprint design tool. In block 610, responsive to the user input, the sentry exploiter executing within the blueprint design tool sends a verification request for a blueprint, e.g., a blueprint selected by the user, to the sentry.

In block 615, the sentry sends an inquiry to each sensor with which a component of the blueprint is registered. The inquiry requests status information for one or more components monitored by the sensor. In one aspect, the inquiry to a particular sensor requests status information for each component of the blueprint that is monitored by the sensor and, as such, maintained within the particular component tool in which the sensor resides.

In block 620, the sentry receives status information from the various sensors to which an inquiry was sent. Status information indicates, for example, whether the component specified by the blueprint is still correct. For example, the blueprint can specify a link to the component. The link can be followed to determine whether the component within a given component tool is still accurately described by the configuration details associated with the component from the blueprint. In this manner, the status information indicates whether the link for the component is still valid. If the link is broken, the status information indicates that the link is no longer valid, which further indicates that the component specified by the blueprint is likely out of date or no longer valid.

In illustration, within a blueprint, the link created for a component such as a data model, a Web Services Description Language (WSDL) service file, an ETL job, or the like is often formulated to include the name of the component, the location of the component, the version of the component, and optionally one or more other parameters of the component. By following the link from the blueprint the linked component, the component is opened in the appropriate component tool and can be reviewed. When the component is changed, e.g., removed, moved, renamed, etc., the link from the blueprint fails to open or locate the component.

In block 625, the sentry aggregates the status information from the sensors. In block 630, the sentry sends the aggregated status information to the sentry exploiter.

Within the blueprint design tool, the status information can be made available to the user in any of a variety of ways. In one aspect, status information can be provided as text. In another aspect, each visual representation of a component within the blueprint as displayed by the blueprint design tool can visually indicate the status of the component as determined from the received status information.

Components that are no longer valid can be displayed with an "X" or colored red, for example. Components that are still valid can be displayed with a check or colored green, for example. The particular manner in which the status of a component is visualized by the blueprint design tool or other system is not intended to be a limitation of the one or more embodiments disclosed within this specification. Any of a variety of visualization techniques can be used if applied consistently so that components of a same status are visualized using same or similar visualization techniques, e.g., all invalid assets are visually modified in the same or similar way.

The one or more embodiments disclosed within this specification facilitate the updating of blueprints for IT systems. Components of an IT system are monitored and changes are noted so that the blueprint for the IT system can be updated. Further, the blueprint for an IT system can be verified responsive to user request to ensure that the components specified within the blueprint are accurate.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer hardware system including a blueprint lifecycle management tool, comprising:
    a hardware processor configured to initiate the following executable operations:
        identifying, within a blueprint defining an information technology system, a plurality of components of the information technology system that are referenced by the blueprint;
        selecting, for each of the plurality of components, between a first class of component tools and a second class of component tools;
        determining whether a component tool selected for a particular component includes a sensor; and
        instructing the sensor to register the particular component, wherein
    the component tool manages the particular component for which the component tool was selected.

2. The system of claim 1, wherein
    the first class of component tools includes operational tools, and
    the second class of component tools includes implementation runtimes and/or metadata repositories.

3. The system of claim 1, wherein
    a determination is made that the component tool does not include the sensor, and
    based upon the determination, the sensor is deployed to the component tool.

4. The system of claim 3, wherein
    the deploying of the sensor includes activating a previously inactive sensor.

5. The system of claim 1, wherein
    the blueprint lifecycle management tool maintains:
        a list of a plurality of components tools and identifies whether each component tool of the plurality of components tools includes a deployed or un-deployed sensor.

6. The system of claim 1, wherein
    the instructing the sensor includes sending, by the blueprint lifecycle management tool, a message to the sensor that specifies the particular component.

7. The system of claim 1, wherein
    the sensor is implemented as a standalone application within the information technology system.

8. The system of claim 7, wherein
    the sensor is configured to respond to a request for information from a sentry within the blueprint lifecycle management tool.

9. The system of claim 1, wherein
    the plurality of components are identified by the blueprint lifecycle management tool parsing the blueprint to identify all linked and referenced components.

10. The system of claim 1, wherein
    the blueprint lifecycle management tool determines whether the sensor was previously deployed to the component tool selected for a particular component.

11. A computer program product, comprising:
    a hardware storage device having stored therein computer program code,
    the computer program code, which when executed by a computer hardware system including a blueprint lifecycle management tool, causes the computer hardware system to perform:

identifying, within a blueprint defining an information technology system, a plurality of components of the information technology system that are referenced by the blueprint;

selecting, for each of the plurality of components, between a first class of component tools and a second class of component tools;

determining whether a component tool selected for a particular component includes a sensor; and instructing the sensor to register the particular component, wherein the component tool manages the particular component for which the component tool was selected.

12. The computer program product of claim 11, wherein the first class of component tools includes operational tools, and the second class of component tools includes implementation runtimes and/or metadata repositories.

13. The computer program product of claim 11, wherein a determination is made that the component tool does not include the sensor, and based upon the determination, the sensor is deployed to the component tool.

14. The computer program product of claim 13, wherein the deploying of the sensor includes activating a previously inactive sensor.

15. The computer program product of claim 11, wherein the blueprint lifecycle management tool maintains:

a list of a plurality of components tools and identifies whether each component tool of the plurality of components tools includes a deployed or un-deployed sensor.

16. The computer program product of claim 11, wherein the instructing the sensor includes sending, by the blueprint lifecycle management tool, a message to the sensor that specifies the particular component.

17. The computer program product of claim 11, wherein the sensor is implemented as a standalone application within the information technology system.

18. The computer program product of claim 17, wherein the sensor is configured to respond to a request for information from a sentry within the blueprint lifecycle management tool.

19. The computer program product of claim 11, wherein the plurality of components are identified by the blueprint lifecycle management tool parsing the blueprint to identify all linked and referenced components.

20. The computer program product of claim 11, wherein the blueprint lifecycle management tool determines whether the sensor was previously deployed to the component tool selected for a particular component.

* * * * *